(12) United States Patent
Fozooni et al.

(10) Patent No.: US 11,831,484 B2
(45) Date of Patent: Nov. 28, 2023

(54) PEAK-TO-AVERAGE POWER RATIO CONTROL

(71) Applicant: Telefonaktiebolaget LM Ericsson (publ), Stockholm (SE)

(72) Inventors: Milad Fozooni, Gothenburg (SE); Ulf Gustavsson, Gothenburg (SE); Pierre-Andre Laporte, Gatineau (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/794,715

(22) PCT Filed: Feb. 4, 2020

(86) PCT No.: PCT/EP2020/052779
§ 371 (c)(1),
(2) Date: Jul. 22, 2022

(87) PCT Pub. No.: WO2021/155917
PCT Pub. Date: Aug. 12, 2021

(65) Prior Publication Data
US 2023/0106464 A1 Apr. 6, 2023

(51) Int. Cl.
*H04L 27/26* (2006.01)
(52) U.S. Cl.
CPC ................ *H04L 27/2615* (2013.01)
(58) Field of Classification Search
CPC .... H04L 27/2615; Y02D 30/70; H04B 7/0465
(Continued)

(56) References Cited

U.S. PATENT DOCUMENTS

| | | | |
|---|---|---|---|
| 11,184,134 B2 * | 11/2021 | Yang | H04L 27/2621 |
| 2008/0013476 A1 * | 1/2008 | Vasudevan | H04L 1/0003 |
| | | | 370/328 |
| 2010/0322090 A1 * | 12/2010 | Zhang | H04W 52/42 |
| | | | 370/252 |

FOREIGN PATENT DOCUMENTS

| | | |
|---|---|---|
| WO | 2018147775 A1 | 8/2018 |
| WO | 2018227111 A1 | 12/2018 |
| WO | 2019069117 A1 | 4/2019 |

OTHER PUBLICATIONS

International Search Report and the Written Opinion of the International Searching Authority, issued in corresponding International Application No. PCT/EP2020/052779, dated Sep. 8, 2020, 10 pages.
(Continued)

*Primary Examiner* — Don N Vo
(74) *Attorney, Agent, or Firm* — ROTHWELL, FIGG, ERNST & MANBECK, P.C.

(57) ABSTRACT

A method of a wireless communication transmitter is disclosed for peak-to-average power ratio (PAPR) control of communication symbols with N time-domain signal samples for transmission via each of M antenna elements. The method comprises: applying a PAPR cost function f(x) which has a proximal operator with closed form and is differentiable in an interval, and the proximal operator comprises a parameter lambda for tuning; selecting a value for lambda to perform a trade-off between PAPR and at least one other characteristic of the wireless communication transmitter; selecting a precoding for the collection of samples as a solution to an optimization problem for the selected value for lambda, wherein the optimization problem comprises minimization of an overall cost function comprising at least the PAPR cost function, and wherein solving the optimization problem comprises using the proximal
(Continued)

operator of the PAPR cost function. Corresponding apparatus, wireless communication transmitter, radio base station, and computer program product are also disclosed.

19 Claims, 3 Drawing Sheets

(58) Field of Classification Search
USPC .......................................... 375/259, 296, 297
See application file for complete search history.

(56) References Cited

OTHER PUBLICATIONS

Studer et al. "PAR-Aware Large-Scale Multi-User MIMO-OFDM Downlink", IEEE Journal on Selected Areas in Communications, IEEE Service Center, Piscataway, US, vol. 31, No. 2, Feb. 1, 2013, (Feb. 1, 2013), p. 303-313, XP011488296.
Studer et al. "Democratic Representations", arxiv.org, Cornell University Library, Jan. 15, 2014 (Jan. 15, 2014), XP080002021, 43 pages.
Parikh et al. "Proximal Algorithms" Foundations and Trends R in Optimization, vol. 1, No. 3 (2013), pp. 123-231.

* cited by examiner

PEAK-TO-AVERAGE POWER RATIO CONTROL

CROSS REFERENCE TO RELATED APPLICATION(S)

This application is a 35 U.S.C. § 371 National Phase Entry Application from PCT/EP2020/052779, filed Feb. 4, 2020, designating the United States, the disclosure of which is incorporated herein by reference in its entirety.

TECHNICAL FIELD

The present disclosure relates generally to the field of wireless communication. More particularly, it relates to controlling the peak-to-average power ratio (PAPR) of a wireless communication transmitter.

BACKGROUND

In some wireless communication systems, a reduced peak-to-average power ratio (PAPR) may be seen as desirable. For example, PAPR reduction may entail improved (e.g., increased) energy efficiency in radio parts of a wireless transmitter. PAPR reduction may, for example, be achieved by any suitable crest-factor reduction (CFR) technique (e.g., clipping and/or filtering).

An example approach for PAPR reduction is described in "Democratic representations" by Studer, Goldstein, Yin, and Baraniuk, 2014, available from http://arxiv.org/abs/1401.3420.

However, this and other approaches for PAPR reduction may have one or more disadvantageous effects in some scenarios. Example disadvantageous effects include increased computational complexity, increased latency, and increased error vector magnitude (EVM) of the communication channel.

Therefore, there is a need for alternative approaches for PAPR control.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

Also generally, when the term energy is mentioned herein, the reference should be construed as equally applicable to the term power; and vice versa.

Also generally, when PAPR is referred to herein, the reference should be construed as equally applicable to crest factor (e.g., a PAPR reduction may correspond to a crest factor reduction, PAPR control may correspond to crest factor control, etc.) and vice versa.

It is an object of some embodiments to solve or mitigate, alleviate, or eliminate at least some of the above or other disadvantages.

A first aspect is a method of a wireless communication transmitter for peak-to-average power ratio (PAPR) control of communication symbols with N time-domain signal samples for transmission via each of M antenna elements.

The method comprises applying a PAPR cost function $f(x)$ which has a proximal operator with closed form and is differentiable in the interval [0, a[, wherein x denotes a collection of samples for transmission (e.g., frequency-domain samples), wherein a denotes a threshold which corresponds to a maximum allowable amplitude for each time-domain signal sample, and wherein the proximal operator comprises a parameter $\lambda$ for tuning.

The method also comprises selecting a value for the parameter $\lambda$, wherein the selection comprises performing a trade-off between PAPR and at least one other characteristic of the wireless communication transmitter, and selecting a precoding for the collection of samples as a solution to an optimization problem for the selected value for the parameter $\lambda$.

The optimization problem comprises minimization of an overall cost function comprising at least the PAPR cost function, and solving the optimization problem comprises using the proximal operator of the PAPR cost function.

In some embodiments, the PAPR cost function has an infinite value in the interval [a, ∞).

In some embodiments, the PAPR cost function is a log-barrier function or a Huber function.

In some embodiments, the log-barrier function is $f(x) = \Sigma_{i=1}^{L} -\log(a-[Ax]_i)$, wherein A denotes a transfer function.

In some embodiments, the proximal operator of the PAPR cost function is defined as $$prox_{\lambda f}(v) = \operatorname*{argmin}_{x}\left( f(x) + \frac{1}{2\lambda}\|x - v\|_2^2 \right).$$

In some embodiments, the optimization problem is $$\operatorname*{argmin}_{x}(f(x) + g(x)),$$

wherein $g(x)$ is a channel transfer penalty function.

In some embodiments, $$g(x) = \begin{cases} 0 & \text{for error free channel transfer} \\ \infty & \text{otherwise} \end{cases}.$$

In some embodiments, solving the optimization problem comprises applying an iterative optimization algorithm, wherein each iteration uses the proximal operator.

In some embodiments, the iterative optimization algorithm is a Douglas-Rachford operator splitting algorithm and/or an alternating direction method of multipliers—ADMM.

In some embodiments, the at least one other characteristic of the wireless communication transmitter comprises an error vector magnitude (EVM).

In some embodiments, performing the trade-off comprises increasing PAPR to improve the at least one other characteristic.

In some embodiments, selecting the value for the parameter $\lambda$ comprises addressing a look-up table of values for the parameter based on the number of antenna elements M, the number of time-domain signal samples N, and use case requirements for PAPR and the at least one other characteristic of the wireless communication transmitter.

In some embodiments, the method further comprises solving the optimization problem for a plurality of values of the parameter λ, and populating the look-up table accordingly.

In some embodiments, the method further comprises transmitting the N time-domain signal samples via the M antenna elements using the selected precoding.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a wireless communication transmitter and for peak-to-average power ratio (PAPR) control of communication symbols with N time-domain signal samples for transmission via each of M antenna elements.

The apparatus comprises controlling circuitry configured to cause application of a PAPR cost function $f(x)$ which has a proximal operator with closed form and is differentiable in the interval [0, a[, wherein x denotes a collection of samples for transmission, wherein a denotes a threshold which corresponds to a maximum allowable amplitude for each time-domain signal sample, and wherein the proximal operator comprises a parameter λ for tuning.

The controlling circuitry is also configured to cause selection of a value for the parameter λ, wherein the selection comprises performance of a trade-off between PAPR and at least one other characteristic of the wireless communication transmitter, and selection of a precoding for the collection of samples as a solution to an optimization problem for the selected value for the parameter λ.

The optimization problem comprises minimization of an overall cost function comprising at least the PAPR cost function, and solving the optimization problem comprises using the proximal operator of the PAPR cost function.

A fourth aspect is a wireless communication transmitter comprising the apparatus of the third aspect.

A fifth aspect is a radio base station comprising the wireless communication transmitter of the fourth aspect.

In some embodiments, any of the above aspects may additionally have features identical with or corresponding to any of the various features as explained above for any of the other aspects.

Generally, the collection of samples for transmission (denoted by x) may be time-domain signal samples for transmission and/or frequency-domain samples for transmission.

For example, the collection of samples for transmission may be a collection of frequency-domain samples for transmission corresponding to the N time-domain signal samples for transmission in an orthogonal frequency division multiplex (OFDM) scenario.

Also generally, the collection of samples for transmission (denoted by x) may, for example, be NM samples; e.g., arranged in a vector.

An advantage of some embodiments is that alternative approaches for PAPR control are provided.

An advantage of some embodiments is that energy efficiency may be improved by PAPR reduction.

An advantage of some embodiments is that computational complexity is unchanged (or very slightly increased) compared to some prior art approaches for PAPR reduction.

An advantage of some embodiments is that PAPR control may be improved. For example, PAPR control according to some embodiments may enable PAPR reduction subject to trade-off against one or more disadvantageous effects (e.g., increased EVM). For example, such trade-off may be conditioned on predefined requirements (constraints) regarding the one or more disadvantageous effects. The predefined requirements may, for example, be associated with a wireless communication use case under consideration.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described whereby alternative approaches for PAPR control are provided.

Figure 1:
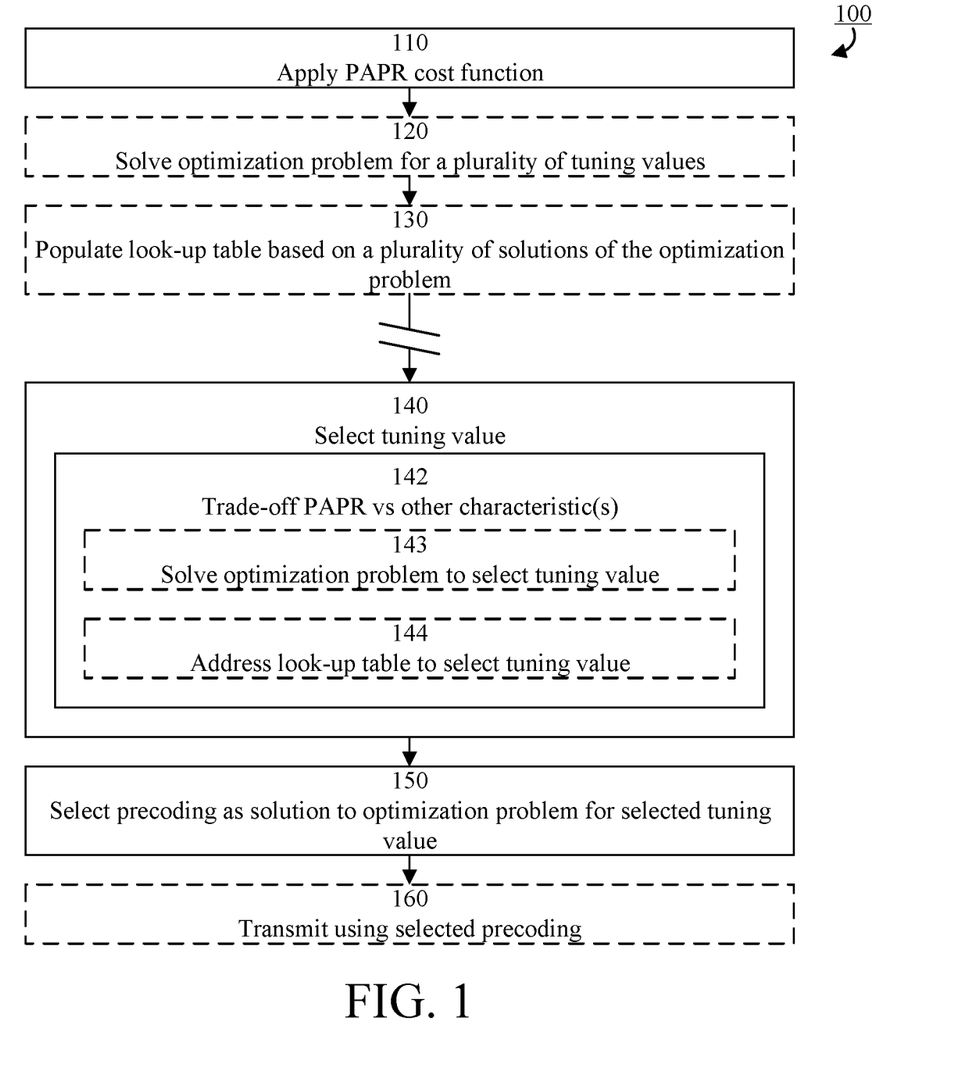
FIG. 1 is a flowchart illustrating example method steps according to some embodiments.

FIG. 1 illustrates an example method 100 according to some embodiments. The method may be performed by an apparatus such as a wireless communication device, a wireless communication transmitter, a network node, or a radio base station.

The method is for PAPR control of communication symbols with N time-domain signal samples for transmission via each of M antenna elements.

Typically N>1 and M>1.

In some embodiments, the method is applied in a large antenna system scenario (e.g., a massive-MIMO scenario) wherein the number M of antenna elements is relatively large; e.g., M>10, M>100, or M>1000. According to some typical examples, M=64 or M=128.

In some embodiments, the method is applied in a scenario wherein the number N of time-domain signal samples for transmission is relatively large; e.g., N>10, N>100, or N>1000.

The number N may typically equal a number of points used in an inverse fast Fourier transform (IFFT) to generate an OFDM symbol.

According to some typical examples, 512<N<8096, wherein N=512, N=1024, N=2048, and N=4096 represent specifically typical values.

The N time-domain signal samples may, for example, be intended for one or more wireless communication receivers, each having one or more receiver antennas.

Typically, the number M of antenna elements is larger than the number of users (wherein users may refer to the number of receivers, for example). This provides a null space in relation to the channel, which can be utilized for optimization and/or trade-off as exemplified in the following.

In some embodiments, the N time-domain signal samples may be N time-domain signal samples of an orthogonal frequency division multiplex (OFDM) symbol; i.e., an OFDM-symbol of length N, and each of the M antenna elements may transmit a corresponding OFDM-symbol using N sub-carriers.

In step 110, a PAPR cost function $f(x)$ is applied to a collection of samples for transmission. For example, the PAPR cost function may be applied to the vector $x = x_1 \ldots x_L$, L=MN, which denotes a vector of frequency-domain samples for transmission, e.g., N frequency-domain samples for each of M antenna elements, stacked into a single vector.

The vector x may be seen as representing a precoded baseband vector for transmission, and it may be seen as an aim for the method 100 to find a suitable precoding (i.e., a suitable x; provided the signal information content is predetermined). A suitable precoding may, for example, be a precoding that keeps the PAPR as low as possible (or lower than a PAPR requirement) while also meeting a requirement of at least one other characteristic of the wireless communication transmitter (e.g., one or more of EVM, complexity, and latency).

Generally, other characteristic of the wireless communication transmitter may include one or more of EVM, complexity, and latency.

Also generally, when one of EVM, complexity, and latency is mentioned herein, the statement is meant to be equally applicable to any other suitable characteristic of the wireless communication transmitter; including EVM, complexity, and latency even if not mentioned.

It should be noted that x does not necessarily have to be represented as a vector. Other possibilities include various matrix representations, for example.

The PAPR cost function $f(x)$ has a closed form proximal operator and is differentiable in the interval [0, a[. Furthermore, the proximal operator of the PAPR cost function has a parameter $\lambda$ for tuning. In some embodiments, the PAPR cost function has an infinite value in the interval [a, ∞).

The value a denotes a threshold which corresponds to a maximum allowable amplitude for each time-domain signal sample. This may alternatively be expressed in terms of a parameter value P which corresponds to a maximum allowable power.

Examples of suitable PAPR cost functions include a log-barrier function and a Huber function.

An example of a suitable formulation of the Huber function is:

$$f(x) = \begin{cases} \frac{1}{2}([Ax]_i - a)^2 & \text{if } |[Ax]_i - a| < \delta \\ \delta|[Ax]_i - a| - \frac{1}{2}\delta^2 & \text{otherwise} \end{cases}$$

The log-barrier function may be expressed as $f(x) = \sum_{i=1}^{L} -\log(a-[Ax]_i)$, wherein A denotes a transfer function. The transfer function A can be any suitable transfer function or the identity matrix. For example, the transfer function may be expressed as $A = F^H T$, where F denotes a Fourier transform matrix and T denotes a permutation or the identity matrix. The proximal operator of the PAPR cost function $f(x)$ is expressed as $$prox_{\lambda f}(v) = \arg\min_x \left( f(x) + \frac{1}{2\lambda} \|x - v\|_2^2 \right).$$

It will now be illustrated for the case where a log-barrier function is used as the PAPR cost function how the parameter $\lambda$ remains available for tuning in the proximal operator.

When $$v = \begin{bmatrix} v_1 \\ v_2 \\ \vdots \\ v_L \end{bmatrix} = \begin{bmatrix} b_1 e^{j\theta_1} \\ b_2 e^{j\theta_2} \\ \vdots \\ b_L e^{j\theta_L} \end{bmatrix}$$

is a given complex vector, and $$x = \begin{bmatrix} x_1 \\ x_2 \\ \vdots \\ x_L \end{bmatrix} = \begin{bmatrix} r_1 e^{j\varphi_1} \\ r_2 e^{j\varphi_2} \\ \vdots \\ r_L e^{j\varphi_L} \end{bmatrix}$$

denotes the vector of variables for precoding, the proximal operator of the log-barrier function expressed as $f(x) = \sum_{i=1}^{L} -\log(a-|x_i|)$ can be obtained as follows:

$$prox_{\lambda f}(v) = \arg\min_x \sum_{i=1}^{L} (-\log(a-|x_i|)) + \frac{1}{2\lambda} \|x - v\|_2^2$$

$$= \arg\min_x \sum_{i=1}^{L} \left( -\log(a-|x_i|) + \frac{1}{2\lambda} |x_i - v_i|^2 \right)$$

$$= \arg\min_{r,\varphi} \sum_{i=1}^{L} \left( -\log(a-r_i) + \frac{1}{2\lambda} |r_i e^{j\varphi_i} - b_i e^{j\theta_i}|^2 \right)$$

$$= \arg\min_r \sum_{i=1}^{L} \left( -\log(a-r_i) + \frac{1}{2\lambda} |(r_i - b_i)e^{j\varphi_i}|^2 \right)$$

$$= \arg\min_r \sum_{i=1}^{L} \left( -\log(a-r_i) + \frac{1}{2\lambda} (r_i - b_i)^2 \right)$$

since the first term is independent of the phase vector $\varphi$ and the second term is minimized for $\varphi_i = \theta_i$, i=1, ..., L. It is noteworthy that the last objective function is convex, differentiable, and also separable in respect of $r_i$ for i=1, ..., L. The minimum can be found by invoking the first derivative test:

$$\frac{\partial}{\partial r_i}\left(\sum_{i=1}^{L}\left(-\log(a-r_i)+\frac{1}{2\lambda}(r_i-b_i)^2\right)\right)=0$$

$$\frac{\partial}{\partial r_i}\left(-\log(a-r_i)+\frac{1}{2\lambda}(r_i-b_i)^2\right)=0$$

$$\frac{1}{a-r_i}+\frac{1}{\lambda}(r_i-b_i)=0$$

$$r_i=\frac{a+b_i-\sqrt{(a-b_i)^2+4\lambda}}{2}$$

Thus, the proximal operator of the log-barrier function can be expressed in closed form where the parameter λ survives and is available for tuning.

An advantage of having the parameter λ available for tuning is that a trade-off between PAPR and at least one other characteristic of the wireless communication transmitter (e.g., one or more of EVM, complexity, and latency) is possible. Thus, the parameter λ may be seen as a trade-off parameter.

In step 140, a value for the parameter λ is selected. The selection comprises performing a trade-off between PAPR and at least one other characteristic of the wireless communication transmitter as illustrated by sub-step 142.

The trade-off may, for example, comprise—in comparison to a specific PAPR value and corresponding values of at least one other characteristic of the wireless communication transmitter—settling for an increased PAPR in exchange for an improvement of the corresponding value of at least one of the other characteristics of the wireless communication transmitter (e.g., decreased computational complexity, decreased latency, and/or decreased EVM of the communication channel). The specific PAPR value may be a PAPR value that would result from application of any prior art method, for example, or from any method wherein tuning is not possible.

Alternatively or additionally, the trade-off may comprise adaptation to one or more use case requirements for PAPR and the at least one other characteristic of the wireless communication transmitter. For example, a wireless communication use case may require one or more of: that PAPR is below a PAPR threshold, that EVM is below an EVM threshold, that computational complexity is below a complexity threshold, and that latency is below a latency threshold. Such use case requirements may, for example be set by wireless communication standardization (e.g., PAPR, EVM, latency) and/or by product specifications (e.g., PAPR, complexity).

In step 150, a precoding is selected for the samples to be transmitted. Selecting precoding may comprise selecting amplitudes and/or phases for the frequency-domain samples.

The precoding is selected as a solution to an optimization problem for the selected value for the parameter λ. The optimization problem comprises minimization of an overall cost function comprising at least the PAPR cost function.

In some embodiments, the optimization problem may comprise minimization the PAPR cost function alone.

In some embodiments, the optimization problem may comprise minimization of an overall cost function comprising the PAPR cost function as a first term and another cost function g(x) as a second term:

$$\mathop{\mathrm{argmin}}_{x}(f(x)+g(x)).$$

In some embodiments, g(x) may be a channel transfer penalty function. For example, error free channel transfer may be represented by Hx=s, where H represents the end-to-end channel transfer function, and s represents the information signal as transmitted. In any case, the channel transfer penalty function may be defined as $$g(x)=\begin{cases}0 & \text{for error free channel transfer}\\ \infty & \text{otherwise}\end{cases}.$$

Generally, solving the optimization problem may comprise using the proximal operator of the PAPR cost function. For example, solving the optimization problem may comprise applying an iterative optimization algorithm, wherein each iteration uses the proximal operator. Example iterative optimization algorithms include the Douglas-Rachford operator splitting algorithm and the alternating direction method of multipliers (ADMM).

In some embodiments, the parameter λ represents a step size of the proximal operator variable and/or a step size used in the Douglas-Rachford splitting algorithm and/or a step size of the alternating direction method of multipliers (ADMM).

When the precoding is selected, the method may further comprise transmitting the N time-domain signal samples via the M antenna elements using the selected precoding, as illustrated by optional step 160.

In some embodiments, step 140 comprises solving the optimization problem in the process of selecting a value for the parameter λ, as illustrated by optional sub-step 143.

In some embodiments, the optimization problem is solved beforehand in a pre-computation step for a plurality of values of the parameter λ, as illustrated by optional step 120, to provide corresponding pre-determined precoding alternatives and/or corresponding pre-determined values of the at least one other characteristic of the wireless communication transmitter.

Then, step 140 may comprise selecting the value for the parameter λ based on corresponding pre-determined values of the at least one other characteristic of the wireless communication transmitter, and step 150 may comprise selecting the precoding based on the pre-determined precoding alternatives.

For example, the value for the parameter λ may be selected as one of the plurality of values used in the pre-computation step; such that the corresponding pre-determined values of the at least one other characteristic of the wireless communication transmitter meet the applicable requirements (e.g., of a use case as elaborated on above). Then, the precoding may be selected as the corresponding pre-determined precoding alternative.

Alternatively or additionally, the value for the parameter may be selected as an interpolation between two of the plurality of values used in the pre-computation step; such that the values of the at least one other characteristic of the wireless communication transmitter will probably meet the applicable requirements. Then, the precoding may be selected as an interpolation between the corresponding two pre-determined precoding alternatives.

It should be noted that numerous other alternatives for selecting the value for the parameter λ and the precoding based on the result of the pre-computation step are also possible.

In some embodiments, the method comprises populating a look-up table (as illustrated by optional step 130) based on a plurality of solutions to the optimization problem using a corresponding plurality of values of the parameter λ. In some embodiments, this is performed for various applicable values of the number of antenna elements M and/or the number of time-domain signal samples N. It should be noted that numerous other implementation alternatives than a look-up table are possible.

For example, the plurality of solutions to the optimization problem may comprise those achieved in the pre-computation step 120. Alternatively or additionally, the plurality of solutions to the optimization problem may comprise solutions achieved in sub-step 143. The latter may lead to successively populating the look-up table during repeated execution of the method 100.

When the look-up table is sufficiently populated, it may be used to perform the trade-off of sub-step 142 for selection of the value for the parameter 2, as illustrated by optional sub-step 144.

For example, the value for the parameter λ may be selected as one of the plurality of values used to populate the look-up table; by addressing the look-up table based on the number of antenna elements M, the number of time-domain signal samples N, and use case requirements for PAPR and the at least one other characteristic of the wireless communication transmitter.

Compared, for example, to the prior art approach for PAPR reduction described in "Democratic representations" (referenced above), some embodiments of the approaches presented herein have one or more of the following advantages:

Possibility to differentiate cost functions and their proximal operators which may simplify optimization and/or make more optimization algorithms possible to apply.
Presence of a tuning parameter in the solution to the optimization problem which enables trade-off between PAPR and at least one other characteristic of the wireless communication transmitter.

In "Democratic representations" (referenced above), the PAPR cost function is defined by the indicator function $$f(x) = \begin{cases} 0 & \text{if } \|Ax\|_\infty \le a \\ \infty & \text{otherwise} \end{cases}.$$

The indicator function has a proximal operator which is non-differentiable. Furthermore, the tuning parameter vanishes during solution to the optimization problem according to the approach described therein.

Figure 2:
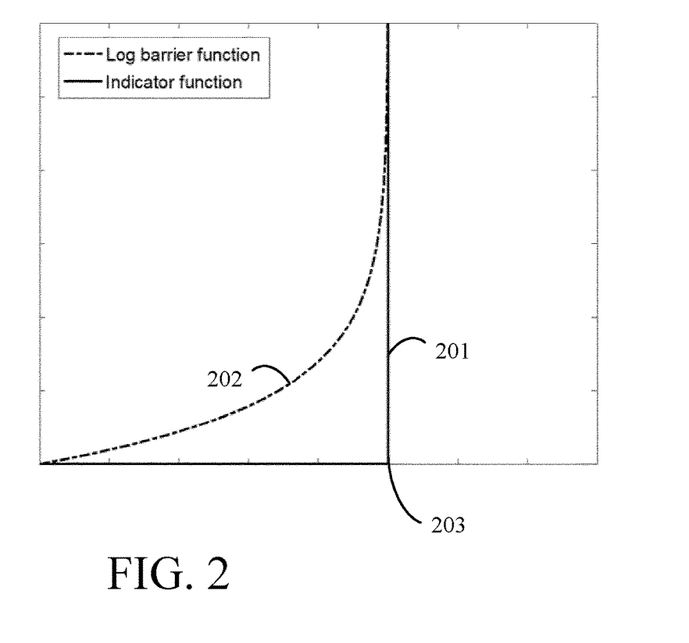
FIG. 2 is a plot illustrating example penalty functions according to some embodiments.

FIG. 2 illustrates example penalty functions that may be used as PAPR cost function $f(x)$; the indicator function 201 used according to some prior art solutions and the log-barrier function 202 $f(x)=\Sigma_{i=1}^{L}-\log(a-[Ax]_i)$ suggested herein. The x-axis illustrates the signal amplitude for one time-domain signal sample $[Ax]_i$ with the maximum allowable value a shown at 203, and the y-axis illustrates the value of the function $f(x)$, which denotes the cost value of the sample, i.e., $-\log(a-[Ax]_i)$ for the log-barrier function.

Figure 3:
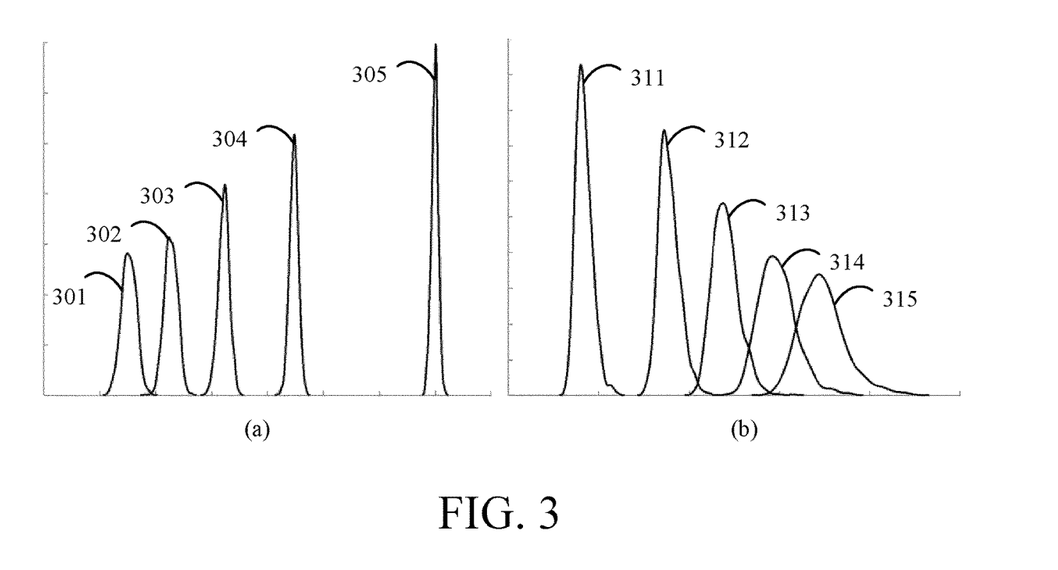
FIG. 3 is a pair of simulation plots illustrating example EVM and PAPR distributions achievable by application of some embodiments.

FIG. 3 illustrates example EVM and PAPR distributions achievable by application of some embodiments.

In this example, a number of 1000 channel realization simulations have been carried out, the number of MIMO spatial layers equals 2, the amplitude threshold has been set to an equivalent PAPR of 3 dB, the number of OFDM subcarriers has been set to N=100, and the number of transmit antenna branches has been set to M=32. Three iterations of the Douglas-Rachford operator splitting algorithm are used for the optimization problem defined as $$\underset{x}{\operatorname{argmin}}(f(x) + g(x))$$

with the log-barrier function as $f(x)$ and $$g(x) = \begin{cases} 0 & \text{for error free channel transfer} \\ \infty & \text{otherwise} \end{cases}.$$

Plot (a) shows probability density functions (PDFs) of EVM for different values of the tuning parameter (301: λ=0.004, 302: λ=0.003, 303: λ=0.002, 304: λ=0.001, 305: λ=0, where the result for λ=0 coincides with the result achievable by the approach of "Democratic representations"). The x-axis represents the EVM value (in % of the reference sample magnitude) and extends from 0% to 40%. The y-axis represents the probability density function value and extends from 0 to 1.4.

Plot (b) shows probability density functions (PDFs) of PAPR for different values of the tuning parameter (311: λ=0, 312: λ=0.001, 313: λ=0.002, 314: λ=0.003, 315: λ=0.004, where the result for λ=0 coincides with the result achievable by the approach of "Democratic representations"). The x-axis represents the PAPR value (in dB) and extends from 0.5 to 3.0. The y-axis represents the probability density function value and extends from 0 to 10.

It can be seen that there is a clear trade-off to be made (corresponding to selection of λ) between a low value of EVM and a low value of PAPR.

It can also be seen that identical performance as that of the algorithm introduced in "Democratic representations" is achievable by tuning λ=0.

Figure 4:
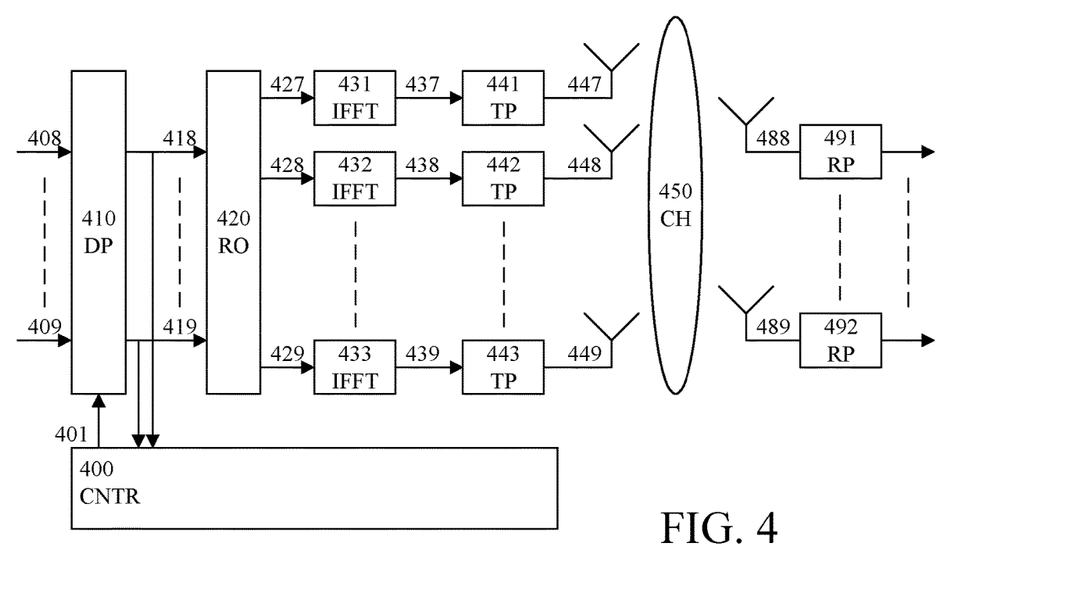
FIG. 4 is a schematic block diagram illustrating an example communication scenario according to some embodiments.

FIG. 4 schematically illustrates an example communication scenario where some embodiments may be applicable.

The left-hand side of FIG. 4 relates to a wireless communication transmitter having M antenna elements, and the right-hand side of FIG. 4 relates to a plurality of K wireless communication receivers. The wireless communication transmitter and the plurality of wireless communication receivers are separated by a frequency-selective channel (CH) 450.

A number of N vector messages $s_i \in \mathbb{C}^{K \times 1}$, i=1, . . . , N—corresponding to N flat fading sub-channels and each with a length K, corresponding to K receivers (users)—represent the information to be transmitted and are input to the wireless communication transmitter as illustrated at 408, 409. After passing a digital precoder (DP) 410, they are represented by N frequency-domain sample vectors $x_i \in \mathbb{C}^{M \times 1}$, i=1, 2, . . . , N, 418, 419, which are input to a re-ordering module (RO) 420 corresponding to the permutation matrix T. After permutation, each of the resulting sample vectors $a_i \in \mathbb{C}_{N \times 1}$, i=1, 2, . . . , M 427, 428, 429 are put through respective inverse fast Fourier transforms (IFFT) 431, 432, 433 corresponding to $F^H$, and the resulting time-domain signals 437, 438, 439 are input to respective transmitter paths (TP) 441, 442, 443 and transmitted via respective ones of the M antenna elements 447, 448, 449. Each transmitter path 441, 442, 443 may, for example, comprise a parallel-to-serial converter, a cyclic prefix prepender, and a power amplifier.

Each of the wireless communication receivers may comprise an antenna 488, 489 and a receiver path (RP) 491, 492. Each receiver path may, for example, comprise a cyclic prefix remover, a serial-to-parallel converter, and a fast Fourier transform (FFT) for recovering the N frequency-domain samples.

The wireless communication transmitter also comprises a controller (CNTR) 400 receiving the N frequency-domain sample vectors $x_i$ 418, 419. The controller may, for example, be configured to execute (or cause execution of) one or more of the method steps as described above in connection with FIG. 1. Particularly, the controller may be configured to select precoding as described in connection with FIG. 1 and control the digital precoder 410 accordingly, as illustrated by control signal 401 in FIG. 4. Alternatively or additionally, the controller may be configured to control other parts of the transmitter (e.g., components of the transmitter paths 441, 442, 443) to enforce the selected precoding.

Figure 5:
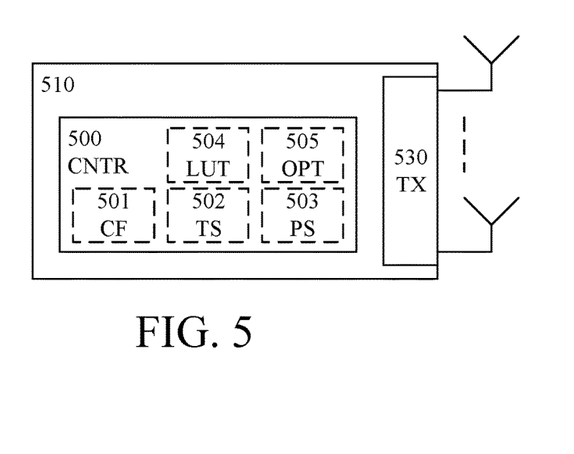
FIG. 5 is a schematic block diagram illustrating an example apparatus according to some embodiments.

FIG. 5 schematically illustrates an example apparatus 510 according to some embodiments.

The apparatus may be comprised, or comprisable, in one or more of a wireless communication device, a wireless communication transmitter, a network node, and a radio base station. Furthermore, the apparatus may be configured to execute (or cause execution of) one or more of the method steps as described above in connection with FIG. 1.

The apparatus is for PAPR control of communication symbols with N time-domain signal samples for transmission via each of M antenna elements (compare with FIG. 4).

The N time-domain signal samples may, for example, be intended for one or more wireless communication receivers, each having one or more receiver antennas.

In some embodiments, the N time-domain signal samples may be N time-domain signal samples of an orthogonal frequency division multiplex (OFDM) symbol; i.e., an OFDM-symbol of length N, and each of the M antenna elements may transmit a corresponding OFDM-symbol using N sub-carriers.

The apparatus comprises a controller 500 (CNTR; e.g., controlling circuitry or a control module—compare with 400 of FIG. 4).

The controller is configured to cause application (compare with step 110 of FIG. 1) of a PAPR cost function $f(x)$ which has a proximal operator with closed form and is differentiable in the interval [0, a[, to a collection of samples (e.g., represented by the vector $x=x_1 \ldots x_L$, L=MN of frequency-domain samples) for transmission, wherein a denotes a threshold which corresponds to a maximum allowable amplitude for each time-domain signal sample, and wherein the proximal operator comprises a parameter $\lambda$ for tuning.

To this end the controller may comprise or be otherwise associated with (e.g., connected, or connectable, to) cost function circuitry or a cost function module (CF) 501. The cost function circuitry or a cost function module may, for example, be a memory configured to store one or more cost functions and provide a suitable cost function for application.

The controller is also configured to cause selection (compare with step 140 of FIG. 1) of a value for the parameter $\lambda$, wherein the selection comprises performance of a trade-off (compare with step 142 of FIG. 1) between PAPR and at least one other characteristic of the wireless communication transmitter.

To this end the controller may comprise or be otherwise associated with (e.g., connected, or connectable, to) a tuning selector (TS; e.g., tuning selection circuitry or a tuning selection module) 502. The tuning selector may be configured to select the value for the parameter $\lambda$.

The controller is also configured to cause selection (compare with step 150 of FIG. 1) of a precoding for the samples as a solution to an optimization problem for the selected value for the parameter $\lambda$, wherein the optimization problem comprises minimization of an overall cost function comprising at least the PAPR cost function, and wherein solving the optimization problem comprises using the proximal operator of the PAPR cost function.

To this end the controller may comprise or be otherwise associated with (e.g., connected, or connectable, to) a precoding selector (PS; e.g., precoding selection circuitry or a precoding selection module) 503. The precoding selector may be configured to select the precoding for the samples.

The controller may also be configured to cause transmission (compare with optional step 160 of FIG. 1) of the N time-domain signal samples via the M antenna elements using the selected precoding.

To this end the controller may be associated with (e.g., connected, or connectable, to) a transmitter (TX; e.g., transmission circuitry or a transmission module) 530. The transmitter, which may—or may not—be comprised in the apparatus 510, may be configured to transmit the N time-domain signal samples via the M antenna elements using the selected precoding.

The controller may also be configured to cause solving (compare with optional steps 120 and 143 of FIG. 1) of the optimization problem for one or more values of the parameter $\lambda$.

To this end the controller may comprise or be otherwise associated with (e.g., connected, or connectable, to) an optimizer (OPT; e.g., optimization circuitry or an optimization module) 505. The optimizer may be configured to solve the optimization problem for one or more values of the parameter $\lambda$.

The controller may also be configured to cause population and/or addressing (compare with optional steps 130 and 144 of FIG. 1) of a look-up table (LUT; e.g., look-up table circuitry or a look-up table module) 504 comprised in—or be otherwise associated with (e.g., connected, or connectable, to) the controller 500.

As exemplified above, the optimization problem may be defined as $$\mathop{\mathrm{argmin}}\limits_{x}(f(x)+g(x)),$$

where $f(x)$ may relate to a requirement that the transmitted amplitude cannot exceed a threshold a and $g(x)$ may relate to a requirement of correct channel transfer of the transmitted information content. Typically, the cost functions $f(x)$ and $g(x)$ may both be convex functions.

More particularly, they may be indicator functions (compare with 201 of FIG. 2) over convex sets. For example, $f(x)$ may be an indicator function over the $\infty$-norm (or max-norm) bounded set, and $g(x)$ may be an indicator function over the affine set (e.g., a set of all solutions to a system of linear equations). This may be explicitly formulated as:

$$\mathop{\mathrm{argmin}}\limits_{x}\left(\begin{cases} 0 & \text{if } \|Ax\|_\infty \leq a \\ \infty & \text{otherwise} \end{cases} + \begin{cases} 0 & \text{if } Hx=s \\ \infty & \text{otherwise} \end{cases}\right)$$

Both functions $f(x)$ and $g(x)$ are non-differentiable in this case. One way to attempt to find a solution to the optimization problem is to apply the Douglas-Rachford (DR) splitting algorithm which iteratively recalls the proximal operator:

| Algorithm 1 Douglas-Rachford Splitting |
| --- |
| Input: $Z^{(0)} = 0$ |
| 1:     function DOUGLAS-RACHFORD($X^{(0)}$) |
| 2:         for k = 1, 2, . . . do |
| 3:             $X^{(k)} \leftarrow prox_{\lambda f}(Z^{(k-1)})$ |
| 4:             $Z^{(k)} \leftarrow Z^{(k-1)} + prox_{\lambda g}(2X^{(k)} - Z^{(k-1)}) - X^{(k)}$ |
| 5:         end for |
| 6:         return $X^{(k)}$ |
| 7:     end function |

Here $Z^{(k-1)}$ represents v, and $X^{(k)}$ represents x, when the proximal operator is expressed as $$prox_{\lambda f}(v) = \arg\min_x \left( f(x) + \frac{1}{2\lambda} \|x - v\|_2^2 \right),$$

and k=0, 1, 2, . . . represents the iteration count. In this algorithm, the parameter has the role of determining a step size for each iteration (distance from v towards optimum—e.g., minimum—of $f(x)$).

When the function $f(x)$ is an indicator function on a convex set, the proximal operator becomes a projection. Thereby, the parameter vanishes.

Hence, when an indicator function is used as $f(x)$, e.g., as in "Democratic representations" (referenced above), the optimization problem becomes non-differentiable, but is solvable using the proximal operator which results in a Projection Onto Convex Sets (POCS) algorithm. However, this leads to that the parameter $\lambda$ vanishes and the corresponding degree of freedom—that could be used to trade-off between PAPR and one or more other characteristic of the wireless communication transmitter—is lost.

As elaborated on above, a log-barrier function $f(x) = \Sigma_{i=1}^{L} -\log(a-[Ax]_i)$ may be used as PAPR cost function instead of an indicator function. This function is differentiable and entails that a tuning parameter is available for trade-off, in the same manner as the function $\Sigma_{i=1}^{L} -\log(a-|x|_i)$ discussed earlier. Then, an optimization problem suitable for the context of "Democratic representations" (referenced above) may be formulated as:

$$\arg\min_x \left( \Sigma_{k=1}^{L} -\log(a - [Ax]_i) + \begin{cases} 0 & \text{if } Hx = s \\ \infty & \text{otherwise} \end{cases} \right)$$

Solving this has the same or comparable complexity compared to the approach in "Democratic representations".

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device, a wireless communication transmitter, a network node, or a radio base station.

Embodiments may appear within an electronic apparatus (such as a wireless communication device, a wireless communication transmitter, a network node, or a radio base station) comprising arrangements, circuitry, and/or logic according to any of the embodiments described herein. Alternatively or additionally, an electronic apparatus (such as a wireless communication device, a wireless communication transmitter, a network node, or a radio base station) may be configured to perform methods according to any of the embodiments described herein.

Figure 6:
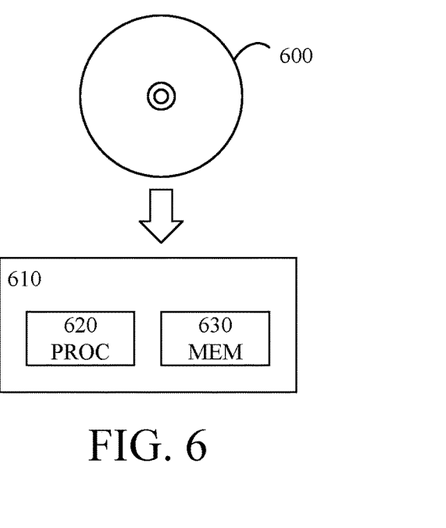
FIG. 6 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a wireless communication device, a wireless communication transmitter, a network node, or a radio base station 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a wireless communication transmitter for peak-to-average power ratio—PAPR—control of communication symbols with N time-domain signal samples for transmission via each of M antenna elements, the method comprising:
applying a PAPR cost function $f(x)$ which has a proximal operator with closed form and is differentiable in the interval [0, a[, wherein x denotes a collection of samples for transmission, wherein a denotes a threshold which corresponds to a maximum allowable amplitude for each time-domain signal sample, and wherein the proximal operator comprises a parameter $\lambda$ for tuning;
selecting a value for the parameter $\lambda$, wherein the selection comprises performing a trade-off between PAPR and at least one other characteristic of the wireless communication transmitter; and
selecting a precoding for the collection of samples as a solution to an optimization problem for the selected value for the parameter $\lambda$, wherein the optimization problem comprises minimization of an overall cost function comprising at least the PAPR cost function, and wherein solving the optimization problem comprises using the proximal operator of the PAPR cost function.

2. The method of claim 1, wherein the PAPR cost function has an infinite value in the interval [a, ∞).

3. The method of claim 1, wherein the PAPR cost function is a log-barrier function or a Huber function.

4. The method of claim 3, wherein the log-barrier function is $f(x)=\Sigma_{i=1}^{L} -\log(a-[Ax]_i)$, wherein A denotes a transfer function.

5. The method of claim 1, wherein the proximal operator of the PAPR cost function is defined as $$prox_{\lambda f}(v) = \underset{x}{\operatorname{argmin}}\left(f(x) + \frac{1}{2\lambda}\|x-v\|_2^2\right).$$

6. The method of claim 1, wherein the optimization problem is $$\underset{x}{\operatorname{argmin}}(f(x)+g(x)),$$

wherein $g(x)$ is a channel transfer penalty function.

7. The method of claim 6, wherein $$g(x) = \begin{cases} 0 & \text{for error free channel transfer} \\ \infty & \text{otherwise} \end{cases}.$$

8. The method of claim 1, wherein solving the optimization problem comprises applying an iterative optimization algorithm, wherein each iteration uses the proximal operator.

9. The method of claim 8, wherein the iterative optimization algorithm is a Douglas-Rachford operator splitting algorithm and/or an alternating direction method of multipliers—ADMM.

10. The method of claim 1, wherein the at least one other characteristic of the wireless communication transmitter comprises an error vector magnitude—EVM.

11. The method of claim 1, wherein performing the trade-off comprises increasing PAPR to improve the at least one other characteristic.

12. The method of claim 1, wherein selecting the value for the parameter $\lambda$ comprises addressing a look-up table of values for the parameter $\lambda$ based on the number of antenna elements M, the number of time-domain signal samples N, and use case requirements for PAPR and the at least one other characteristic of the wireless communication transmitter.

13. The method of claim 12, further comprising solving the optimization problem for a plurality of values of the parameter $\lambda$, and populating the look-up table accordingly.

14. The method of claim 1, further comprising transmitting the N time-domain signal samples via the M antenna elements using the selected precoding.

15. A computer program product comprising a non-transitory computer readable medium, having thereon a computer program comprising program instructions, the computer program being loadable into a data processing unit and configured to cause execution of the method according to claim 1 when the computer program is run by the data processing unit.

16. An apparatus for a wireless communication transmitter and for peak-to-average power ratio—PAPR—control of communication symbols with N time-domain signal samples for transmission via each of M antenna elements, the apparatus comprising controlling circuitry configured to cause:
application of a PAPR cost function $f(x)$ which has a proximal operator with closed form and is differentiable in the interval [0, a[, wherein x denotes a collection of samples for transmission, wherein denotes a threshold which corresponds to a maximum allowable amplitude for each time-domain signal sample, and wherein the proximal operator comprises a parameter $\lambda$ for tuning; selection of a value for the parameter $\lambda$, wherein the selection comprises performance of a trade-off between PAPR and at least one other characteristic of the wireless communication transmitter; and
selection of a precoding for the collection of samples as a solution to an optimization problem for the selected value for the parameter A, wherein the optimization problem comprises minimization of an overall cost function comprising at least the PAPR cost function, and wherein solving the optimization problem comprises using the proximal operator of the PAPR cost function.

17. The apparatus of claim 16, wherein the controlling circuitry is configured to:
apply a PAPR cost function $f(x)$ which has a proximal operator with closed form and is differentiable in the interval [0, a[, wherein x denotes a collection of samples for transmission, wherein a denotes a threshold which corresponds to a maximum allowable amplitude for each time-domain signal sample, and wherein the proximal operator comprises a parameter $\lambda$ for tuning;
select a value for the parameter $\lambda$, wherein the selection comprises performing a trade-off between PAPR and at least one other characteristic of the wireless communication transmitter; and
select a precoding for the collection of samples as a solution to an optimization problem for the selected value for the parameter $\lambda$, wherein the optimization problem comprises minimization of an overall cost function comprising at least the PAPR cost function, and wherein solving the optimization problem comprises using the proximal operator of the PAPR cost function.

18. A wireless communication transmitter comprising the apparatus of claim 16.

19. A radio base station comprising the wireless communication transmitter of claim 18.

\* \* \* \* \*